(12) United States Patent
Held et al.

(10) Patent No.: US 11,919,188 B2
(45) Date of Patent: Mar. 5, 2024

(54) METHOD FOR CUTTING CUT PARTS AND CUTTING DEVICE

(71) Applicant: HEFA Holding GmbH, Heusenstamm (DE)

(72) Inventors: Gunnar Held, Heusenstamm (DE); Achim Zinke, Heusenstamm (DE)

(73) Assignee: HEFA Holding GmbH, Heusenstamm (DE)

( * ) Notice: Subject to any disclaimer, the term of this patent is extended or adjusted under 35 U.S.C. 154(b) by 251 days.

(21) Appl. No.: 16/768,746

(22) PCT Filed: Nov. 23, 2018

(86) PCT No.: PCT/EP2018/082398
§ 371 (c)(1),
(2) Date: Jun. 1, 2020

(87) PCT Pub. No.: WO2019/105863
PCT Pub. Date: Jun. 6, 2019

(65) Prior Publication Data
US 2021/0170618 A1    Jun. 10, 2021

(30) Foreign Application Priority Data
Nov. 30, 2017 (DE) ..................... 10 2017 128 394.3

(51) Int. Cl.
*B26D 5/00* (2006.01)
*B23K 26/03* (2006.01)
(Continued)

(52) U.S. Cl.
CPC .............. *B26D 5/005* (2013.01); *B23K 26/03* (2013.01); *B23K 26/50* (2015.10); *D06H 7/24* (2013.01);
(Continued)

(58) Field of Classification Search
CPC ........... B23K 26/03; B23K 26/50; B26D 5/00
See application file for complete search history.

(56) References Cited

U.S. PATENT DOCUMENTS

| | | | |
|---|---|---|---|
| 3,761,675 A * | 9/1973 | Mason ...................... | B26F 3/16 700/134 |
| 5,806,390 A | 9/1998 | Pomerleau et al. | |

(Continued)

FOREIGN PATENT DOCUMENTS

| | | |
|---|---|---|
| DE | 10 2010 044 721 A1 | 3/2012 |
| DE | 10 2013 014 609 A1 | 3/2014 |

(Continued)

*Primary Examiner* — Binh X Tran
(74) *Attorney, Agent, or Firm* — Potomac Law Group, PLLC; Vincent M DeLuca

(57) ABSTRACT

The invention relates to a method (100) for cutting cut parts (1, 2, 3, 4, 5, 6; 12, 13, 14, 15, 16, 17, 18), wherein the cut parts (1, 2, 3, 4, 5, 6; 12, 13, 14, 15, 16, 17, 18) produce a cutting pattern (7), said method having the following method step: cutting (106) the cut parts (1, 2, 3, 4, 5, 6; 12, 13, 14, 15, 16, 17, 18), wherein the cut parts (1, 2, 3, 4, 5, 6; 12, 13, 14, 15, 16, 17, 18) are arranged in a rectangular, repeating portion (9, 9') of an endless single ply material web (19), wherein the portion (9) at least one cut part (1, 2, 3, 4, 5, 6; 12, 13, 14, 15, 16, 17, 18) or at least one cutting pattern (7) is contained in part (10, 11). The method additionally comprises a computer program product and a device for cutting by means of a cutting tool.

13 Claims, 8 Drawing Sheets

(51) Int. Cl.
  *B23K 26/50* (2014.01)
  *D06H 7/24* (2006.01)
  *B26D 7/01* (2006.01)

(52) U.S. Cl.
  CPC ........ *B26D 2005/002* (2013.01); *B26D 7/015* (2013.01)

(56) References Cited

U.S. PATENT DOCUMENTS

| | | | |
|---|---|---|---|
| 7,154,530 | B2 | 12/2006 | Andrews et al. |
| 9,782,906 | B1 * | 10/2017 | Aminpour .............. B26D 5/005 |
| 2003/0118229 | A1 * | 6/2003 | Andrews .............. B23Q 15/013 |
| | | | 382/141 |
| 2004/0262902 | A1 | 12/2004 | Keshavaraj |
| 2008/0084053 | A1 | 4/2008 | Bouquier et al. |
| 2009/0236827 | A1 | 9/2009 | Abramczyk et al. |
| 2017/0356125 | A1 | 12/2017 | Held |

FOREIGN PATENT DOCUMENTS

| | | | |
|---|---|---|---|
| DE | 10 2013 112 259 A1 | 5/2015 | |
| EP | 0070172 B1 * | 8/1985 | |
| EP | 1321839 A2 * | 6/2003 | ........... B23Q 15/013 |
| EP | 1321839 A2 | 6/2003 | |
| EP | 1574404 A2 | 9/2005 | |
| GB | 1382541 A | 2/1975 | |
| JP | S4882491 A | 11/1973 | |
| JP | S5240075 B1 | 10/1977 | |
| JP | 2005513642 A | 5/2005 | |
| WO | 91/17029 A1 | 11/1991 | |
| WO | 0140805 A1 | 1/2001 | |
| WO | 03/029540 A1 | 4/2003 | |
| WO | 2016082915 A1 | 6/2016 | |
| WO | WO-2017144533 A1 * | 8/2017 | ........... B41J 11/008 |

* cited by examiner

Fig. 2 - Prior Art

Fig. 5 - Prior Art
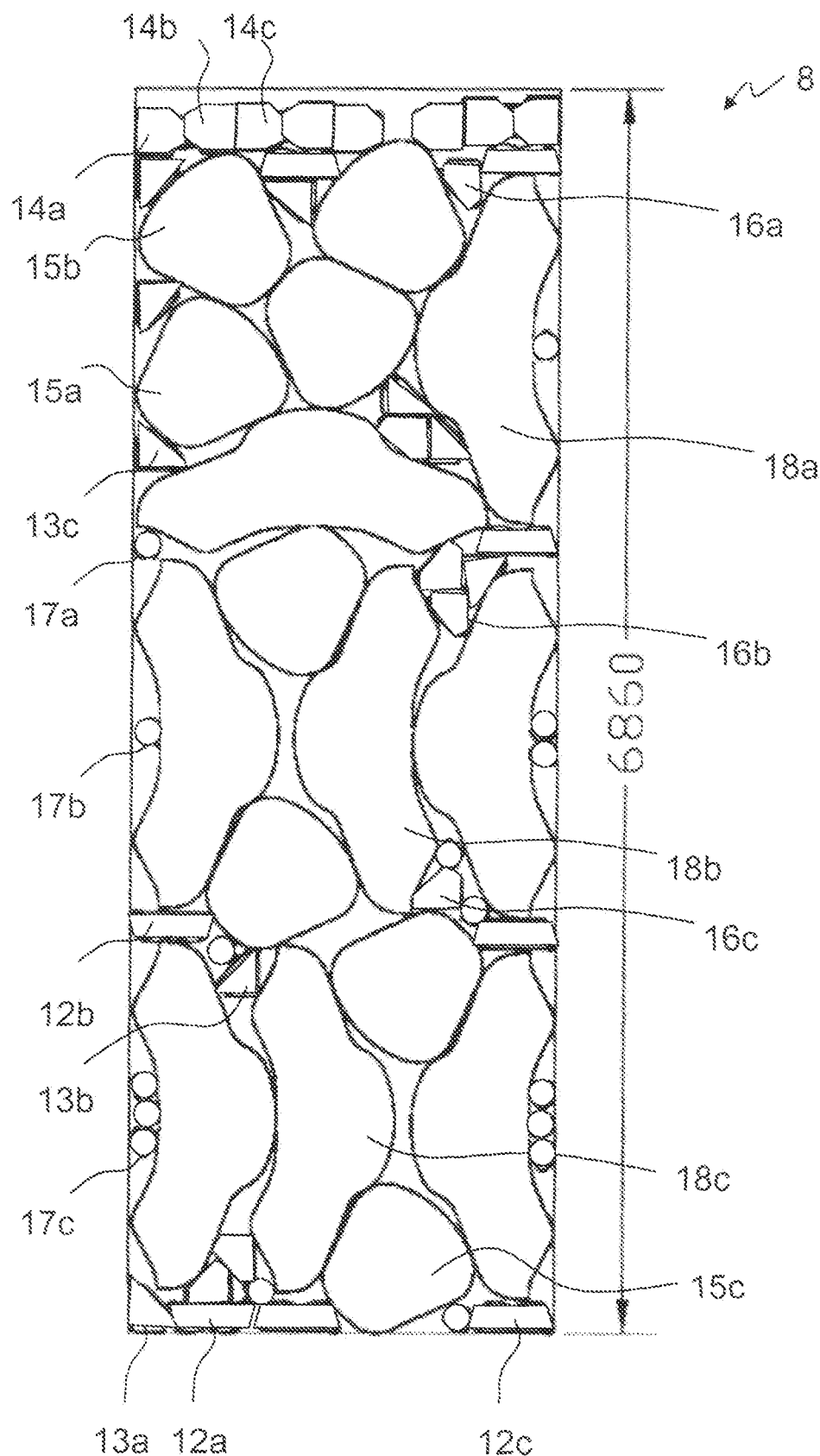

METHOD FOR CUTTING CUT PARTS AND CUTTING DEVICE

The invention relates to a method for cutting cut pieces which are arranged, for example, on a single-layer material web, and a device for cutting by means of a cutting tool. The method according to the invention is particularly suitable for cutting out cut pieces for airbags from the material web. The method is preferably used in conjunction with a laser cutting device as a cutting tool.

BACKGROUND OF THE INVENTION

For example, DE 10 2014 017 501 A1 describes a method for cutting out objects from an at least partially two-layer material web using a cutting device. These objects are cut out of the material web based on cut pieces of a cutting pattern. These objects can be clothing articles, furniture upholstery and/or airbags.

For example, the material is provided as roll material. The material is unrolled from a roll to a specified length and placed on a cutting table. Then another layer of the material is unrolled from the roll according to the same specified length and placed exactly above the first layer of the material. This arrangement of further layers is repeated until a desired number of layers of the material are arranged on top of each other on the cutting table. This number of layers can now be cut simultaneously with a cutting tool. In this way, the cutting tool is used efficiently, and the cutting of the material is accelerated, as the individual cut pieces in the individual material layers are cut simultaneously.

In many applications of these cutting methods, such as in the production of airbag pieces, the cut pieces must be cut precisely to meet all safety-relevant aspects of the durability of the object, for example, when high pressure is used inside the object. If many material webs are laid on top of each other and then cut at the same time, safety margins must be defined between the individual cut pieces and at the outer edges of each material web in order to avoid cutting the shape of the cut piece incorrectly. These safety distances or safety areas are several centimeters large and significantly increase the material consumption per layer of the material web.

The part of the material that is not used or cannot be used for any other part of the cut after cutting is called material waste. This material waste occurs, for example, because the part of the material web that is surplus after cutting is too small for a further cut piece or because the remaining part of the material web does not have an area in which a further cut piece of the cutting pattern can be fully placed. This material waste can therefore usually not be reused and is a waste product of the cutting process. Especially with cost-intensive material webs, such as in airbag production, the remaining part of the material web should be reduced to a minimum.

When cutting patterns, also known as "cut-set", from a web, the individual cut pieces should be arranged in a space-saving manner in order to keep the material waste to a minimum. For example, special nesting methods are used to arrange the cut-sets that belong to a cutting pattern in a space-saving way.

Nowadays, these nesting methods are designed exclusively for rectangular sections of a material web and optimize the material only in terms of the length or discrete widths of the rectangle in which the cut pieces of one or more cutting patterns are placed. Due to the simultaneous cutting of a large number of superimposed web layers, for example up to 40 layers, and the safety distances to be taken into account, the material waste is too large despite these nesting methods and the resulting waste makes the use of the conventional cutting method undesirably expensive. Usually a safety margin of 25 to 50 millimeters is added at the beginning and end of each layer of the material web. This is necessary, for example, when cutting several layers in order to compensate for slippage between the layers.

The object of the present invention is therefore to considerably reduce the material consumption when cutting cut pieces of a cutting pattern.

SUMMARY OF THE INVENTION

The object is solved by the features of the independent claims. Preferred embodiments are given in the dependent claims.

In particular, the object is solved by a method for cutting cut pieces. The cut pieces form a cutting pattern. The method comprises cutting the cut pieces, wherein the cut pieces are arranged in a rectangular, repeating section of a continuous material web, and wherein at least one cut piece or at least one cutting pattern is partially contained in the section.

A cutting pattern, also called a cut pattern, refers to a template according to which the material is cut. The cutting pattern has, for example, a finite number of different and/or identical cut pieces, according to which the material is then cut. The cut pieces can have different shapes, which can vary greatly from one cut piece to the next. In addition, individual cut pieces of a cutting pattern can exist several times, so that a cutting pattern can consist, for example, of a first number of cut pieces of a first shape and an identical or different number of cut pieces of a second shape. For example, cutting patterns for airbags can be cut. A cutting pattern for an airbag has at least one cut piece in the cutting pattern, but generally several cut pieces, and preferably five to ten differently shaped cut pieces. Each of these differently shaped cut pieces is present at least once, usually several times, in the cutting pattern, to form the airbag. A cutting pattern can thus be formed from a large number of uniform and/or differently shaped cut pieces.

In a preferred embodiment, the material web is a woven technical textile ("woven fabric"). This includes (or consists of), for example, carbon fibre, glass fibre or a mixed material containing carbon fibre or glass fibre or other synthetic materials or textiles. The woven technical textile can also contain other plastics or textiles. Parameters of the woven textile are the fibre material used (percentage, e.g. 50% cotton); area weight in $g/m^2$; thread density (number of warp and weft threads per unit length) and weave type.

In a preferred embodiment, the material web is a metal sheet, preferably a thin metal sheet with a material thickness of less than 3 mm according to EN 10130 or EN 10346, for example for automotive parts; metal industry; electrical engineering or a heavy metal sheet with a material thickness of more than 3 mm according to EN 1007, for example in ship and boat building.

In a preferred embodiment, the material web is a foil, preferably a metal with a material thickness of less than 60 micrometer, for example a steel foil, an aluminum foil, a tin foil or a gold foil (gold leaf). Alternatively, the foil can also be a plastic or rubber material. These foils are for example an adhesive foil, a glass decoration foil, an adhesive foil, a bubble wrap, a tubular foil, a shrink foil, a sun protection foil, or a stretch foil. This foil can be used for example as battery foil or solar foil.

In a preferred embodiment, the material web is made of cardboard (cardboard box). A distinction is made between different types of cardboard: solid cardboard, which is single-ply and couched, also glued, glued together, impregnated or coated; wrapped cardboard made of pulp or waste paper; grey/brown cardboard as protective material or interleaving material; hard cardboard, such as body board, shoe board, jacquard board, suitcase board, punched cardboard, marbled cardboard, burnt cardboard; light cardboard; archive or fine cardboard. In an embodiment, the material web is made of paper is thus a flat material consisting essentially of fibres.

Paper, cardboard and paperboard are classified according to their mass per unit area. DIN 6730 avoids the term cardboard and distinguishes only between paper and cardboard on the basis of the limit value 225 g/m². Colloquially, however, cardboard is a common term for a material in the range 150 g/m2 to 600 g/m², which is typically thicker and stiffer than paper.

In a preferred embodiment, the material web is made of nonwoven fabric, a structure of fibres of limited length, continuous fibres or cut yarns, which are joined together to form a nonwoven fabric (fibre layer, fibre pile) and bonded to each other in some way, for example mechanically by frictional or frictional/form engagement or chemically or thermally. This non-woven fabric can be used, for example, as filter material, such as air filters in a motor vehicle.

In the following, the "cut piece" is defined as a two-dimensional shape of any shape, i.e. a surface on the material web with a circumference of any shape. The cut piece forms at least partially any homogeneous or heterogeneous figure of the Euclidean or non-Euclidean geometry, for example any polygon or polygon course, circle, conical section, cycloid, spiral, fractal or any other arbitrarily shaped path or curve.

The cut pieces and the cutting pattern do not have to be marked on the material web. This means that a cutting tool control executes the movements of the cutting tool without detecting marker points/lines on the material web, for example. In an embodiment of the invention, only edge markings are present on the material web in order to enable the control to make a target/actual comparison of a position of the cutting tool.

The term "material web" means a web of material whose width is constant over the entire length of the material web. Its width can be several meters; preferably, the width of the web is greater than one or two meters.

The material web is "endless". This means that the material web can be provided as roll material and that material is provided quasi endless. "Endless" can be understood to mean that the material web for cutting has no fixed beginning and no fixed end for arranging the cut pieces. Such a provision of the material represents a substantial difference to the conventional cutting methods, in particular the simultaneous cutting of several layers of a material web of a predefined length lying on top of each other.

The material web can be a single layer. The term "single layer" is used to describe a material web from which only one cut piece is cut per cutting movement of the cutting tool, i.e. in particular no multiple layers are cut for a plurality of cut pieces. A "section" is defined in the cutting process. This section can be limited by the lateral outer limits of the material web. In this case the width of the section corresponds to the width of the web. The section is also rectangular. Thus, the section is bounded by two section boundaries perpendicular to the lateral outer boundaries. Between these two vertical section boundaries, at least a part of the cutting pattern and/or one of the cut pieces can be arranged. For example, this section represents a virtual size and therefore does not have to be marked on the material web.

The section defines a repeating area on the material web with a particular arrangement of cutting patterns and/or cut pieces. The term "repeat" means that the arrangement of cutting patterns and/or cut pieces selected in the section is the same for a number of consecutive sections and is therefore repeated in subsequent sections.

If the material web is endless and can be transported further after the cutting step, cut pieces and/or cutting patterns can be arranged in an overlapping manner. Thus, according to the invention, it is possible to arrange a cut piece and/or a cutting pattern only partially in one section of the material web.

The partial arrangement of the cutting pattern means in particular that at least one cut piece of the cutting pattern does not have to be included completely, i.e. not with its shape defined according to the cutting pattern, in the virtually defined repeating section and, for example, is arranged in the following section—for example between cut pieces of a following cutting pattern. This also means that this cut piece does not have to be arranged with its entire circumference within the section.

The partial arrangement of a cut piece means in particular that the cut piece is not completely included in the rectangular section. The section is repeated with a constant (certain) arrangement of the cut pieces, so that the cut pieces and/or cutting patterns can be cut in the sections at the same place.

In particular, the arrangement of at least one cut piece and/or cutting pattern is only partial, so that a number of cut pieces and/or cutting patterns corresponds to a set of rational numbers without integers, i.e. a real fraction. For example, 4.6 pieces are arranged in a section, wherein only 60% of a cut piece of the cut pieces is arranged in the section and the remaining 40% of the cut piece is arranged in a subsequent section.

In addition, a cutting pattern can also be arranged only at a first portion, i.e. partially, so that the remaining portion of this cutting pattern is arranged in a subsequent section. This means that a first portion of the cut piece is arranged in a first section and the remaining second portion of this cut piece is arranged in a subsequent section.

In this way, a nesting method optimized to a length of the material web can be further improved, in particular by not keeping a predefined length of a material web for the complete arrangement of all cut pieces of a cutting pattern. This means that the associated safety distances can be eliminated. For example, it is unnecessary to define safety distances to be maintained for the predefined length of the material web at the vertical section boundaries. This enables enormous material savings. By saving the safety area at the beginning and end of the material web, the material usage can be reduced by approximately 0.5 to 1 percent.

According to the invention, a cutting pattern to be arranged on the material web with a corresponding number of cutting pieces can also be arranged partially outside a rectangular section of the material web. The boundary between the individual cutting patterns on the material web is no longer necessarily straight, the boundary can be, for example, bent, i.e. not straight. The boundary between the cutting patterns can therefore have a length greater than the shortest distance between the two outer edges of the web.

In a preferred embodiment, the material web is made of woven material. Webs of this type require precise cutting and thus make it very difficult to arrange the cut pieces and/or cutting patterns in a tightly nested manner. The cut pieces of the cutting pattern and/or the cutting pattern can form an airbag. These cut pieces must be cut precisely to meet safety requirements and the intended use.

In a preferred embodiment, the material web is made of non-woven material, such as paper, cardboard, sheet metal, non-woven fabric, foil. In a preferred embodiment, a layout algorithm can be applied before cutting. In this case, the cut pieces are arranged in the repeating section of the continuous single-layer material web as follows: First a space requirement of the cut pieces in the section of the material web is calculated for at least one arrangement variant of the cut pieces in this section, wherein at least one cut piece and/or one cutting pattern is only partially included in the section of the material web.

The arrangement of the cut pieces of one or more cutting patterns is nested, i.e. a nesting method is used. In this method, at least one cut piece of a cutting pattern is arranged next to another cut piece of the cutting pattern or another cutting pattern in such a space-saving manner that the material waste is less than if these cut pieces were arranged in the same orientation and/or on a grid on the material web. The nesting method used can be applied to one or more cut pieces of one or more cutting patterns.

In one embodiment of the invention, the arrangement of the cut piece is dependent on the orientation of the weft and warp of the woven material in the material web, for example to meet load requirements of the cut piece or the cutting pattern.

When non-woven materials are used, the orientation of the cut piece on the material web has—when compared to woven materials—a higher degree of freedom, since an alternative arrangement (e.g. rotation of the cut piece) does not cause a change in the material property.

The term "arrangement variant" refers to the fact that cut pieces and/or cutting patterns are arranged in a specific arrangement and the space requirement is calculated for this specific arrangement variant.

The space requirement is understood in particular as the material requirement of the cut pieces and/or the cutting patterns on the material web for the repeated section, if necessary with safety distances to an outer area of the material web and/or to adjacent cut pieces to be taken into account.

After the calculation step, a selection of the arrangement variant of the cut pieces for this section can be made based on the result of the calculation step. By the selection step, a particular arrangement variant for which the space requirement was previously calculated is defined or determined.

The selection of the arrangement variant is preferably made for a particular arrangement variant and is used for successive, i.e. repeating sections of the material web. The determined arrangement variant can thus be used for a large number of cut pieces and/or cutting patterns, wherein the material waste is considerably reduced. For the present method, a preferred arrangement variant for a cutting pattern is calculated for a repeating section and the arrangement variant determined in this way is then repeated for a large number of successive sections.

Alternatively or additionally, the selection can also be made for a defined number of consecutive sections, wherein a different arrangement variant can be selected for each section of the sequence of sections. In this way, a comparatively large cutting pattern or a large cutting piece can be arranged over several sections in a space-saving manner. An efficient arrangement variant is then defined for this sequence of sections. This is useful if the area of the material web to be cut by the cutting tool is smaller than the area of the piece or pattern to be cut.

Alternatively or additionally, the selection can also be made before each cutting process, so to speak, an on-the-fly calculation of cut pieces or cutting patterns to be cut takes place for each section. In this way, completely different cutting patterns can be arranged very flexibly and can then be cut spontaneously, always minimizing material waste.

In a preferred embodiment, the space requirement of the cut pieces in the section of the material web is calculated on the basis of a pure or single-type arrangement of the cut pieces as an arrangement variant. According to the invention, a pure or single-type arrangement is an arrangement variant in which only identical, i.e. identically shaped cut pieces are arranged in a nested manner. These cut pieces all have the same shape and size.

In a further preferred embodiment, the single-type cut piece is arranged and the space required for this arrangement is calculated. In a first variant, the number of single-type cut pieces to be placed is only partially dependent on the number of cutting patterns to be cut. For example, if the number of cutting patterns is very large, e.g. more than 500 pieces, the placement is selected in such a way that a maximum number of cut pieces is arranged on a minimum length of the material web. This way, if a density of cut pieces per web section is maximal, then a comparatively small number of excessive cut pieces can be arranged on the web in relation to the maximum number of cut pieces required.

This small number represents a material requirement which is nevertheless lower than with an alternative arrangement. In a second variant, the single-type cut piece is arranged according to the number of this particular cut piece required for the cutting pattern, and the space requirement is calculated for this.

In an alternative embodiment, the single-type cut piece is arranged according to the number of this particular cut piece required for a predefined number of cutting patterns, and the space requirement is calculated for this arrangement.

Alternatively, if the single-type cut piece is included in several different cutting patterns, the cut piece is arranged according to the number required for them, and the space required for this arrangement is calculated.

Alternatively or additionally, the cut pieces are arranged for a minimum length of the material web (for a given width of the material web) at maximum number, i.e. maximum density. In this case, a maximum number of cut pieces is arranged on a given subsection of the material web, so that a maximum density for this cut piece is achieved for this subsection. The space requirement is determined for this arrangement. In a next step of the calculation, a subset of the cut pieces, for example two or three cut pieces of the cutting pattern, is selected for this section and the calculation is repeated. If necessary, this calculation step is repeated for different subsets and finally the arrangement variant with the smallest space requirement is selected. These subsections can be part of the repeated section on the material web. Thus, a single-type placement or the largest possible number of cut pieces or a subset of cut pieces is placed on the smallest possible area. This placement can be done in a repeating rectangular section of the material web.

In this way, single-type cut pieces can be arranged very flexibly in a group, wherein a layout variant requiring less material can be calculated and selected.

In a preferred embodiment, the space requirement of the cut pieces in the section of the material web is calculated on the basis of a subset of different cut pieces as an arrangement variant. A subset or subgroup of cut pieces is a subset of all cut pieces required for at least one cutting pattern. The subset comprises at least two different cut pieces of one and/or more cutting patterns. In this way, certain cut pieces can be placed together, wherein a less material-requiring arrangement variant can be calculated and selected.

In a preferred embodiment, the selection of the different cut pieces is done as a subset based on the area of the cut piece and/or the shape of the cut piece. Thus, cut pieces of the same size and/or shape can be arranged in a nested manner. In addition, different cut pieces can be placed together in combination if their combination allows a space-saving arrangement. For example, a second cut piece can be placed in a cut-out or a hole of a first cut piece.

In a preferred embodiment, the space requirement on the material web can be calculated on the basis of all cut pieces of at least one cutting pattern as an arrangement variant. In this way, the cut pieces of a cutting pattern can be arranged in the section to save space.

The result of the different arrangement variants and in particular the calculation of the space requirement in the section of the material web is decisive for which arrangement variant is defined or determined. In particular, the arrangement in single-type cut pieces and/or subsets of cut pieces is advantageous if the material waste can be minimized and thus material savings can be achieved.

In a preferred embodiment, the arrangement variant is selected as soon as a predefined threshold value for a material waste is reached or as soon as a calculation time has exceeded a predefined threshold value. This threshold value can be entered as a parameter for the process and serves in particular as a termination condition for the arrangement of the cut pieces and/or cutting patterns in the repeating section of the material web. The predefined threshold value is, for example, a final optimization value, so that the selection of an arrangement variant takes place in finite time, i.e. the arrangement algorithm has a termination condition when an optimum is reached. For example, the area of all the cut pieces to be arranged for a first particular arrangement variant is calculated. This first value is subtracted from the area of the section of the material web to obtain a first material waste value. Then, the area of all cut pieces to be arranged for a second particular arrangement variant is calculated. This second value is also subtracted from the area of the section to obtain a second material waste value. Then the first material waste value is subtracted from the second material waste value to obtain a material waste difference value. This material waste difference value is compared with the predefined threshold value. If the comparison result shows that the material waste difference value is less than or equal to the predefined threshold value, the method for arranging the cut pieces and/or cutting patterns is terminated.

Preferably, a safety distance value between the cut pieces is defined and taken into account in the process. A safety distance between the cut pieces can be very small, for example less than 2 mm. The safety distance can also be omitted, i.e. equal to zero millimeters, so that adjacent cut pieces share a cutting edge. Ideally, the amount of material used during cutting is included in the calculation for the cut piece.

In a preferred embodiment, the section has a predefined length, which is set as an input parameter for the process. Thus, the area of the material web available for arranging the cut pieces and/or cutting patterns can be limited and defined.

In a preferred embodiment, a number of at least one cutting pattern to be cut is specified. Alternatively or additionally, for the cutting of different cutting patterns, a number can be specified for each of the different cutting patterns.

For example, a first cutting pattern represents a first airbag of a first vehicle type. A second cutting pattern represents a second airbag of the first vehicle type or a second vehicle type. The airbags could be driver/passenger and/or side airbags. According to the invention, these cutting patterns can be arranged individually nested on the material web. Alternatively or additionally, the cutting patterns can now also be arranged in a combined fashion.

In a preferred embodiment, for the arrangement of the cut pieces in one section, at least one of the cut pieces is shifted and/or rotated relative to another cut piece. In this way, nesting of individual cut pieces is simplified.

The object is also solved by a computer program product for the arrangement of cut pieces in a section of an endless material web, wherein program parts can be retrieved from a program memory, which support the execution of the method in one of the above ways. The material web can be single layer. Alternatively, several endless material webs, for example between 2 and 10 material webs, preferably 5 material webs, can be laid on top of each other. This increases the efficiency of the cutting process.

The object is also solved by a device for cutting cut pieces from an endless single-layer material web with a control system configured to carry out a method according to one of the above examples. Thus, a single-layer, endless material web is used to cut pieces. The cutting is therefore not done on individual, superimposed material webs, but on a single-layer endless material web. This allows, for example, a safety area to be saved at the beginning and end of a section.

The cutting tool may be a laser cutting device for laser cutting. This laser cutting, also known as laser beam cutting, enables the material web to be cut through by means of continuous or pulsed laser radiation by means of material ablation. Almost any material, for example fabric, paper, cardboard, metal, can be cut with this laser radiation. The parameters of the laser beam, such as wavelength, average power, pulse energy and pulse duration must be adapted to the application. The microscopic ablation mechanism and the thermal effects are essentially determined by the pulse duration and the irradiance. Laser cutting is used here to cut the cut pieces of the cutting patterns with their sometimes very complex outlines precisely and quickly, typically at up to 30 meters per minute, occasionally at over 300 meters per minute (5 m/sec for remote cutting). Laser cutting is contactless and almost force-free. The laser cutting devices used are usually focused high-power lasers, mostly the $CO_2$ laser as gas laser or increasingly neodymium-YAG (Nd-YAG) laser as solid-state laser as well as fibre lasers that can be easily focused.

According to the invention, no straight termination of a material web is used for arranging the cut pieces and/or the cutting pattern, so that at least one cut piece and/or cutting pattern can be arranged only partially in the repeating rectangular section. Thus, cutting patterns can be arranged in a nested manner. A cutting pattern can thus be started in a first section and finished in a second section following the first section. The repetition of the section can take place immediately or only after a certain sequence of sections of alternative arrangement variants.

With this method, not only is the material length optimized, but different calculation methods are used for different arrangement variants to calculate a minimum space requirement. The space requirements of the individual particular arrangement variants are calculated. On the basis of the calculation, a particular arrangement variant is then selected that has the smallest material waste. In this way, several percent savings potential for the material web is possible.

According to the invention, cutting is carried out on an endless material web, wherein the cut pieces of the cutting patterns are arranged in a material-saving manner. For an airbag, the complete cutting pattern consists of several different cut pieces in very different shapes.

When cutting the various cut pieces from the rectangular endless material web, the individual sections can be placed directly next to each other, so that a safety area of several centimeters at the beginning and end of the material web is no longer required. With a material web length of 8 meters, this means that 1.25% material can be saved.

When arranging the cut pieces of at least one cutting pattern in, for example, single-type cut pieces or subsets or complete cutting patterns (i.e., when using all the different cut pieces of at least one cutting pattern), considerable material savings can be achieved according to the invention, because single-type cut pieces or subsets of cut pieces can sometimes be nested in a much more space-saving manner, for example, through clever rotation or shifting on the material web.

The advantage of the invention is also based on the fact that no straight section termination of the nested arrangement is required transversely to the conveying direction of the material web, but a bent, i.e. non-straight section termination can also be used. Thus, the beginning of a subsequent arrangement of cut pieces and/or cutting patterns can be placed in a gap of the previous nested arrangement. This nesting is not possible in conventional nesting methods of such cutting processes, because these conventional methods always require a straight section end. Only partially placed cut pieces in a section can therefore not be completed and would make the cutting process more expensive due to material waste. It is also possible, according to the invention, to arrange a cut piece or a cutting pattern across sections so that it starts in a first section and ends in a second section, i.e. the first repetition of the first section.

In this way, several percent of the material to be cut can be saved. In the field of airbag production, one percent saved material means high savings of costs per year for a vehicle with a very high number of units.

According to the invention, this technology can be used in all processes in which recurring cutting patterns are created from a roll of material. The placement is based on a calculation of different arrangement variants, wherein, in addition to a single-type placement, a combination of subsets of different cut pieces of a cutting pattern is calculated and taken into account.

BRIEF SUMMARY OF THE DRAWINGS

In the following, the invention or further embodiments and advantages of the invention are explained in more detail by means of the figures, wherein the figures merely describe embodiments of the invention. Identical components in the figures are provided with identical reference signs. The figures are not to be regarded as true to scale; individual elements of the figures may be represented in an exaggeratedly large or simplified form. It is shown:

FIG. 5 is an alternative example of a cutting pattern with cut pieces for an airbag in a first arrangement variant;

DETAILED DESCRIPTION

Figure 1:
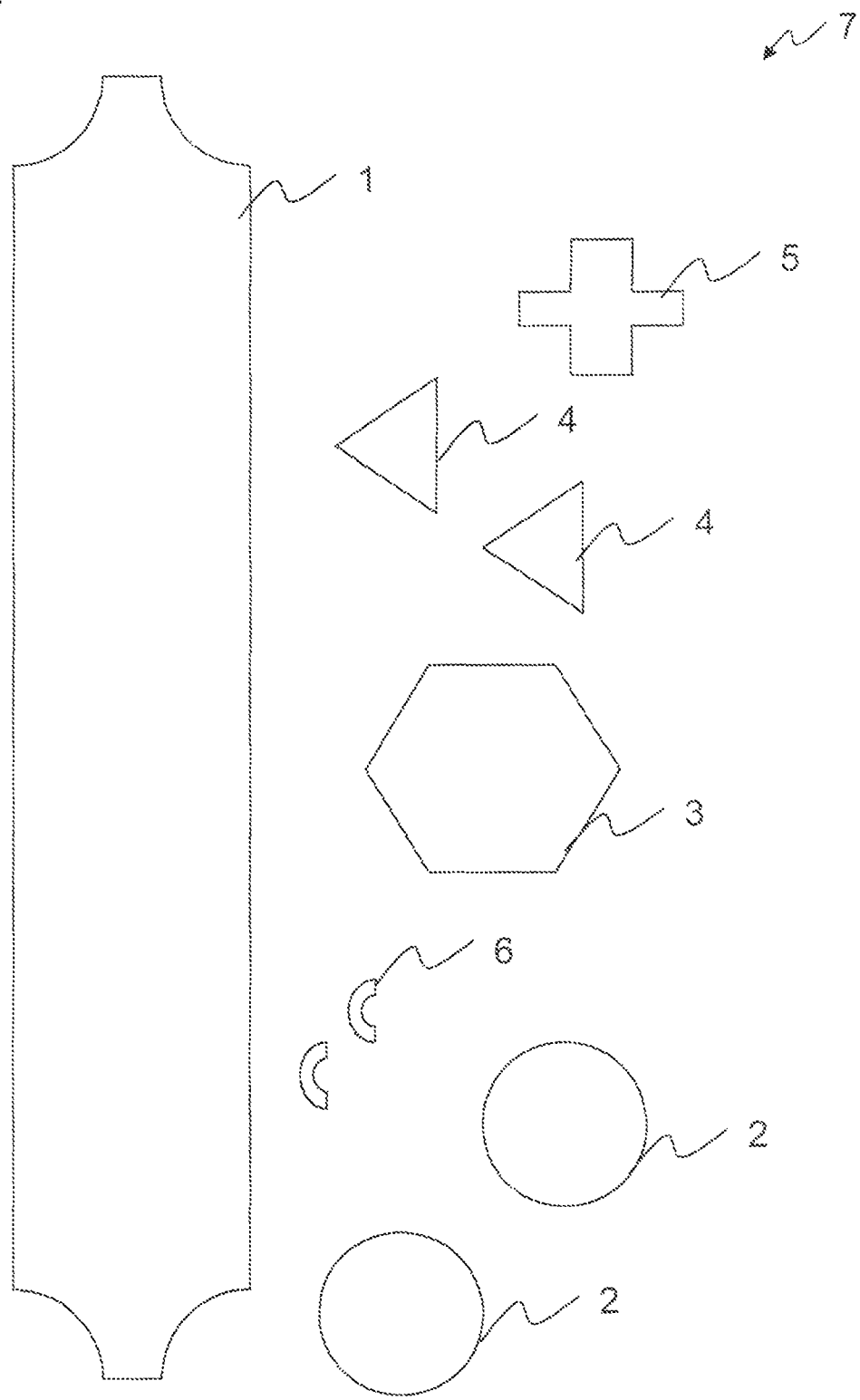
FIG. 1 is an example of a cutting pattern with cut pieces for an airbag.

FIG. 1 shows a cutting pattern 7 for an airbag. Cutting pattern 7 consists of a total of nine cut pieces 1 to 6, wherein cut piece 2, cut piece 4 and cut piece 6 each exist twice in cutting pattern 7. These nine cut pieces 1 to 6 form cutting pattern 7 for an airbag for a motor vehicle, for example. The shapes and sizes of the cut pieces 1 to 6 vary greatly.

In order to arrange these nine cut pieces 1 to 6 of cutting pattern 7 in a space-saving manner on a material web 19 and to cut them with a small, minimum amount of material waste, the method according to the invention is used.

According to the invention, different arrangement variants of cutting pattern 7 and/or cut pieces 1 to 6 of at least one group 8, 8' of the same cutting pattern 7 or also different cutting patterns are simulated, i.e. calculated.

Figure 4A:
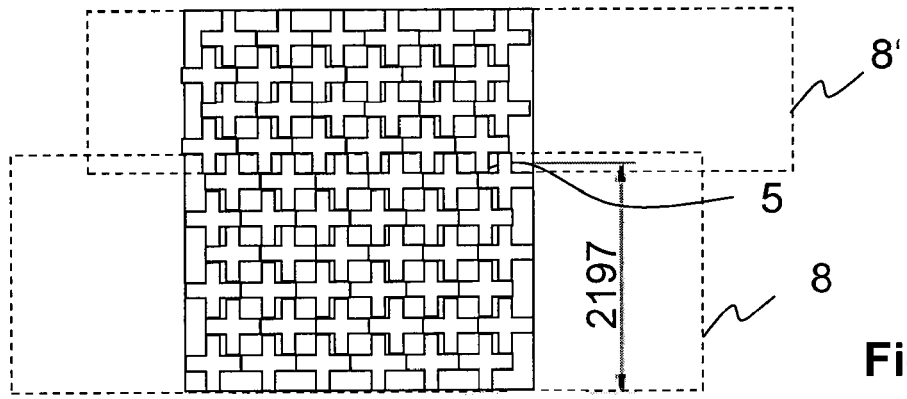
FIGS. 4a-4c show single-type arrangement variants for a group of identical cutting patterns according to FIG. 1 using one of the cut pieces according to the invention.
Figure 4B:
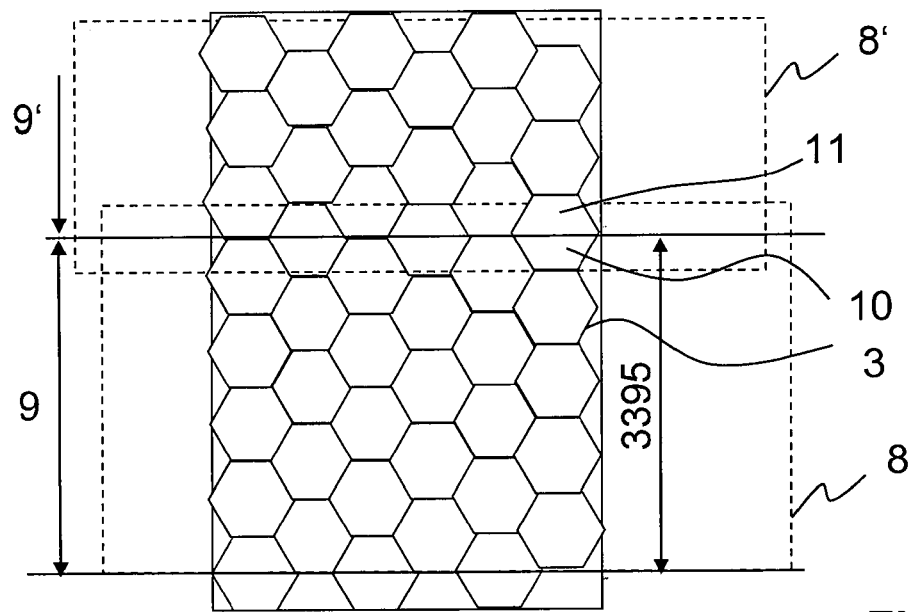
Figure 4C:
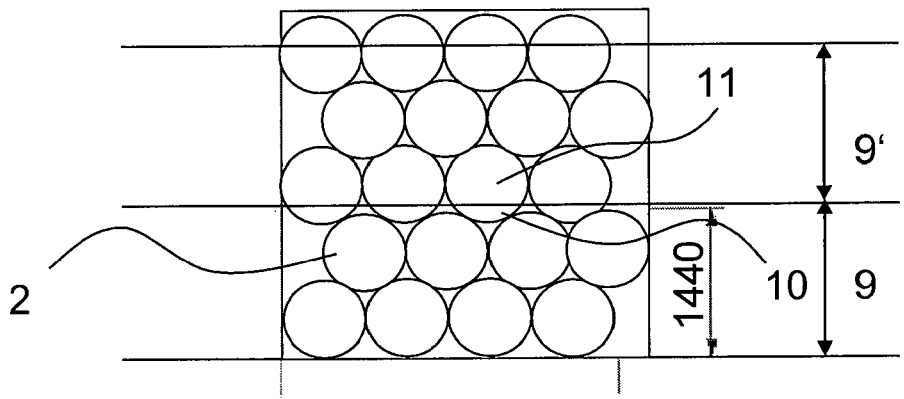

The individual cut pieces 1 to 6 of cutting pattern 7, for example, are arranged in a single-type manner (as shown in FIGS. 4a to 4c) and the space required for the respective cut piece is determined.

In a further arrangement variant, the individual cut pieces 1 to 6 of cutting pattern 7 are arranged, for example in subsets (as explained in more detail in FIG. 3) and the space required for the respective cut pieces 1 to 6 is determined. The cut pieces 1 to 6 per subset are selected according to their size or shape. The number of different cut pieces 1 to 6 per subset as well as the number of cut pieces 1 to 6 itself are not limited.

Finally, all the different cut pieces 1 to 6 of cutting pattern 7 (as shown for example in FIG. 2) can be arranged and the space required for the respective cutting pattern 7 with all the different cut pieces 1 to 6 in section 9 or a group 8, 8' of cutting pattern 7 can be determined.

For each arrangement variant, the space requirement and the material waste are calculated and finally the arrangement variant is selected for which the least material waste was calculated. For this purpose, various input parameters can be specified for the process, for example the maximum number of cutting patterns to be cut or a cut-off length or also the minimum material waste to be achieved.

Figure 2:
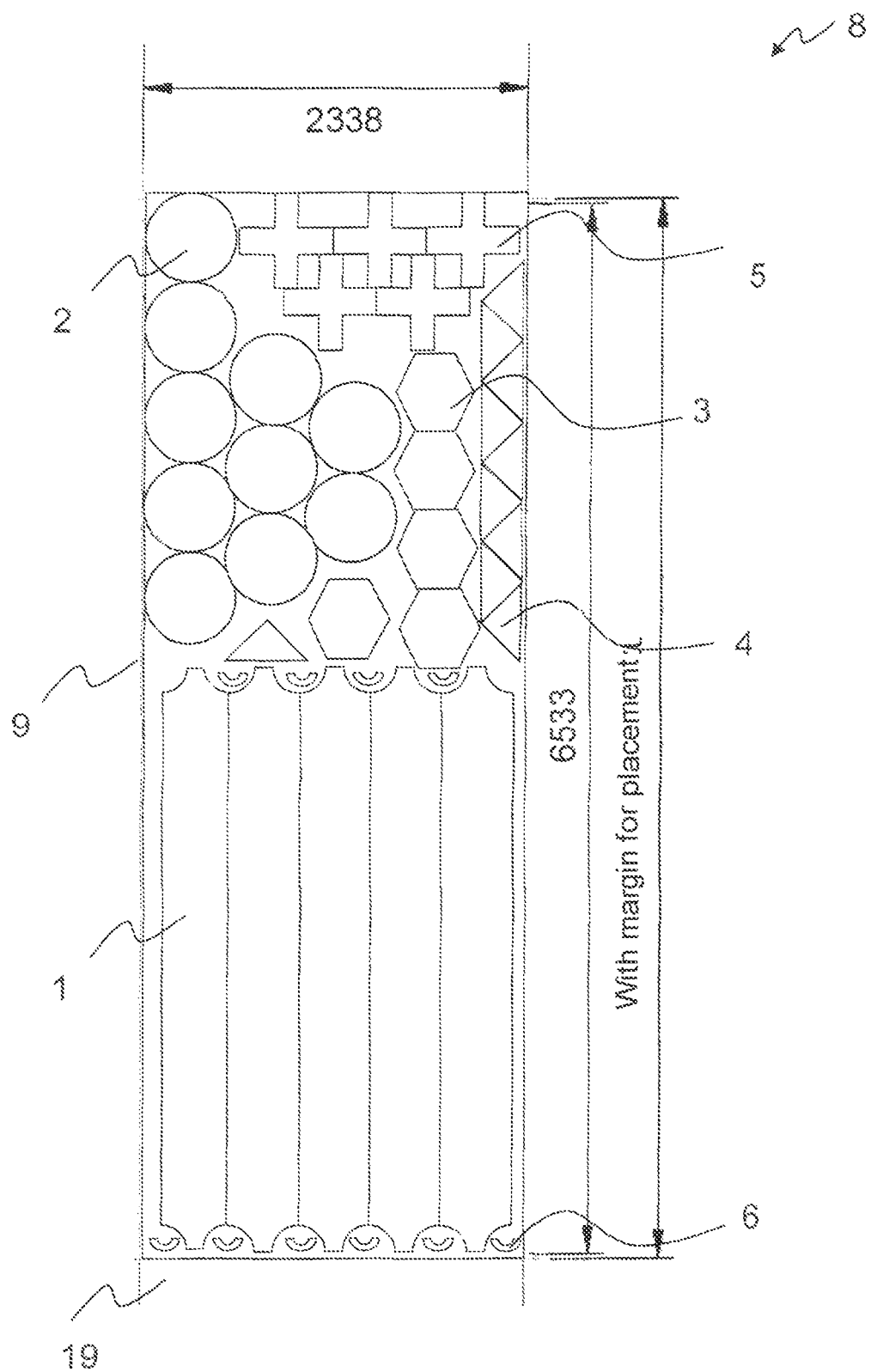
FIG. 2 is an arrangement variant for a group of identical cutting patterns according to FIG. 1 using all the required cut pieces.

In FIG. 2 a first particular arrangement variant of the nine cut pieces 1 to 6 of the cutting pattern 7 shown in FIG. 1 is exemplarily shown. The same cutting pattern 7 from FIG. 1 is arranged five times in total in FIG. 2 so that in FIG. 2 a group 8 of five identical cutting patterns 7 is shown. With the arrangement variant from FIG. 2 five cutting patterns 7, here five airbags, can be cut from the material web 19. In FIG. 2 of total of 45 cut pieces 1 to 6 are shown and placed.

All cut pieces 1 to 6 of group 8 of five cutting patterns 7 are placed in a rectangular section 9 with a width of 2335 millimeters and a length of 6593 millimeters, wherein in this exemplary arrangement 30 millimeters safety distance per transverse side (i.e. side length transverse to the material web 19) is included, i.e. a total safety distance of 60 millimeters would have to be added. This arrangement variant according to FIG. 2 can also be used for a cutting process with several layers of the material web 19 and the conventional simultaneous cutting by means of a cutting tool. This arrangement variant according to FIG. 2 requires a length of the material web of 6593 millimeters for group 8 of the five cutting patterns 7, so that a length of 1318.6 millimeters (6593 millimeters divided by number 5) is required for each cutting pattern.

According to the invention, the space requirement per cutting pattern 7 is further reduced in order to minimize material waste. For this purpose, the required space is first calculated for various arrangement variants.

Figure 3:
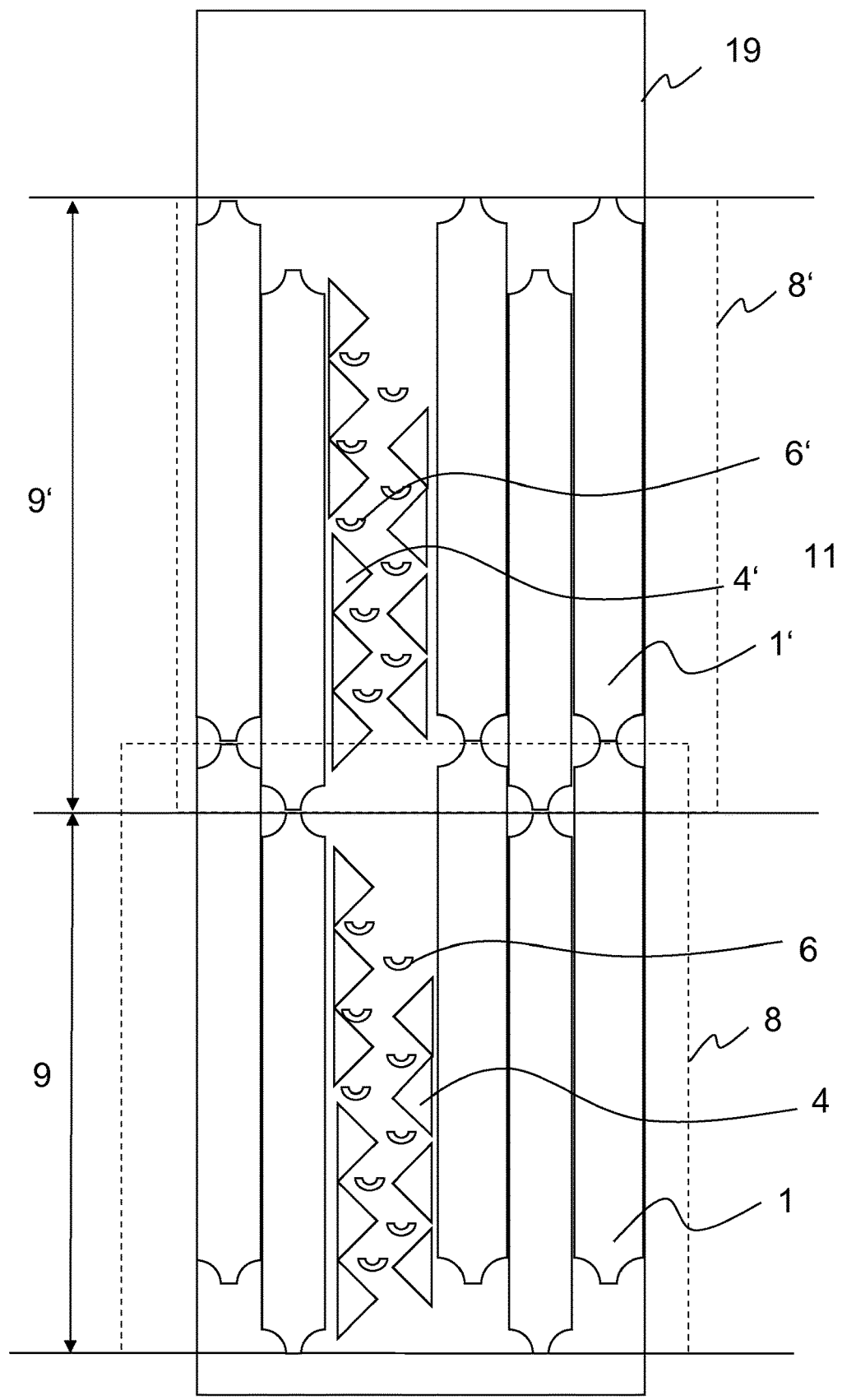
FIG. 3 is an alternative arrangement variant for a group of identical cutting patterns according to FIG. 1 using a subset of the required cut pieces according to the invention.

In FIG. 3, for example, a further arrangement variant for cutting pattern 7 with the cut pieces 1 to 6 from FIG. 1 is shown. In FIG. 3 two successive sections 9, 9' on an endless material web 19 are shown. These sections 9, 9' are rectangular and their width is identical to the width of the material web 19. The material web 19 is available as roll material, for example.

In section 9 of FIG. 3, only a subset of all cut pieces 1 to 6 of a cutting pattern 7 of FIG. 1 is arranged. Here the cut pieces 1, 4, 6 were placed as a subset of all cut pieces 1 to 6 of the same cutting pattern 7. Thus, the cutting pattern 7 is only partly contained in section 9. This subset consisting of the cut pieces 1, 4 and 6 of cutting pattern 7 according to FIG. 1 requires a material web length of 3043 millimeters. The space requirement can be reduced by cleverly arranging the cut pieces 4 and 6 between two cut pieces 1. Thus, calculating the space requirement results in a material web length of 609 millimeters (3043 millimeters divided by the number 5) being required for each subset menu of cutting pattern 7.

According to the invention, a large number of cutting patterns 7 are to be cut from the endless single-layer material web 19. Therefore, if more than 5 cutting patterns 7 are to be placed on the material web 19, the large-area cut pieces 1 from group 8 of the first five cutting patterns 7 are nested into the following group 8' consisting of five more cutting patterns 7 to further reduce the space required. In addition, five cut pieces 6' from the following group 8' of cutting pattern 7 are already placed in section 9. Furthermore, due to the endless material web 19, the safety distance between the sections 9 and 9' used in FIG. 2 can be omitted. The material web 19 can have multiple layers.

In FIG. 4a to FIG. 4c the remaining cut pieces 5, 3 and 2 of group 8 from five identical cutting patterns 7 are now placed in a particular arrangement variant according to FIG. 1 and their space requirements are determined.

For example, for the cut piece 5 an arrangement variant is chosen in which the cut piece 5 of cutting pattern 7 from FIG. 1 is placed according to FIG. 4a in a single-type manner. The individual cut pieces 5 are first shifted and/or rotated on the material web in such a way that their space requirement is minimised. According to FIG. 4a, 24 cut pieces 5 of a first group 8 are placed on a length of 2197 millimeters. In this arrangement variant, calculating the space requirement results in a length of only 91.54 millimeters (2197 millimeters divided by the number 24) being required per cut piece 5.

Due to the large number of cutting patterns 7 to be cut from the endless single-layer material web 19, more than 5 cutting patterns 7 are also placed on the material web 19 as shown in FIG. 4a, so that the cut pieces 5 from group 8 of the first 24 cutting patterns 7 are nested in the following group 8' consisting of further cutting patterns 7. Furthermore, due to the endless single-layer material web 19, the safety distance between the individual sections used in FIG. 2 (not explicitly shown here) can be omitted.

In addition, for example for cut piece 3, an arrangement variant is also selected in which the cut piece 3 of cutting pattern 7 from FIG. 1 is placed according to FIG. 4b in a single-type manner. The individual cut pieces 3 are first shifted and/or rotated on the material web 19 in such a way that their space requirement is minimised. According to FIG. 4b 24 cut pieces 3 of a first group 8 are placed on a length of 3395 millimeters. In this arrangement variant, the calculation of the space requirement results in that only a length of 141.46 millimeters (3395 millimeters divided by the number 24) is required per cut piece 3.

Due to the large number of cutting patterns 7 to be cut from the endless single-layer material web 19, more than five cutting patterns 7 will also be placed on the material web 19 as shown in FIG. 4b, so that the cut pieces 3 from group 8 of the first 24 cutting patterns 7 are nested in the following group 8' consisting of further cutting patterns 7. The cut pieces 2 are placed across the sections. Thus, in a first section 9, first portions 10 of a total of three cut pieces 3 are arranged and in a subsequent second section 9' (not completely illustrated) the corresponding second portions 11 of the three cut pieces 3 are arranged. In addition, due to the endless single-layer material web 19, the safety distance between the individual sections used in FIG. 2 (not explicitly shown here) can be omitted.

In addition, for example for cut piece 2, an arrangement variant is also selected in which the cut piece 2 of the cutting pattern 7 from FIG. 1 is placed according to FIG. 4c in a single-type manner. The individual cut pieces 2 are first shifted and/or rotated on the material web 19 in such a way that their space requirement is minimised. According to FIG. 4c 8 cut pieces 2 of a first group 8 are placed on a length of 1440 millimeters. In this arrangement, calculating the space requirement results in a length of 180 millimeters (1440 millimeters divided by the number of 8) being required for each cut piece 2. Since cut piece 2 is needed twice in cutting pattern 7, the space required for cut piece 2 is doubled to 360 millimeters in a single-type arrangement.

Due to the large number of cutting patterns 7 to be cut from the endless single-layer material web 19, more than five cutting patterns 7 will also be placed on the material web 19 as shown in FIG. 4c, so that the cut pieces 2 from group 8 of the first 8 cutting patterns 7 are nested in the following group 8' consisting of further cutting patterns 7. In this case, cut pieces 2 are placed across the sections. Thus, in a first section 9 first portions 10 of a total of four cut pieces 2 are arranged and in a following second section 9' the corresponding second portions 11 of the four cut pieces 2 are arranged. Due to the endless single-layer material web 19, the safety distance between the individual sections 9 and 9' used in FIG. 2 can also be omitted.

In the calculation step a total space requirement per cutting pattern 7 of FIG. 1 is determined for cutting the cutting pattern 7 of the arrangement variants according to FIG. 3 to FIG. 4a to FIG. 4c. A cutting pattern 7 requires a total length of 1202 millimeters if its cut pieces 1 to 6 are arranged according to FIGS. 3, 4a to 4c. This total length corresponds to the sum of the space requirement of the individual cut pieces, namely 609 millimeters for the subset of cut pieces 1, 4, 6; 360 millimeters for cut piece 2 (double); 141.46 millimeters for cut piece 3 and 91.54 millimeters for cut piece 5.

If the cutting pattern 7 of FIG. 1 is arranged according to FIGS. 3, 4a to 4c, an 8% material saving is possible, because the required 1318.6 millimeters per cutting pattern 7 according to the arrangement variant of FIG. 2 is reduced to 1202 millimeters per cutting pattern 7 according to the arrangement variant from FIGS. 3, 4a to 4c.

The cutting time for one of the cutting patterns 7 consisting of the nine cut pieces 1 to 6 is 7.2 seconds. This cutting time is composed as follows:

The arrangement variant of the subset of cutting pattern 7 in section 9 of the material web 19 according to FIG. 3 is cut in 18 seconds, as a total of 10.3 meters of material web per minute can be cut. Thus, for each subset of the cut pieces 1, 4 (double) and 6 (double) a cutting time of 3.6 seconds is required (18 seconds divided by number 5).

The arrangement variant of cut piece 5 of cutting pattern 7 in section 9 of material web 19 according to FIG. 4a is cut in 18 seconds, as a total of 7.3 meters of material web can be cut per minute. Therefore, a cutting time of 0.75 seconds is required per cut piece 5 (18 seconds divided by 24).

The arrangement variant of cut piece 3 of cutting pattern 7 in section 9 of the material web 19 according to FIG. 4b is cut in 25 seconds, as a total of 8.1 meters of material web per minute can be cut. Therefore, a cutting time of 1.04 seconds is required per cut piece 3 (25 seconds divided by 24). The arrangement variant of cut piece 2 of cutting pattern 7 in section 9 of the material web 19 according to FIG. 4c is cut in 6.2 seconds, as a total of 14 meters of material web can be cut per minute. Therefore, a cutting time of 0.8 seconds is required per cut piece 2 (6.2 seconds divided by number 8). As two cut pieces 2 are required in cutting pattern 7 as shown in FIG. 1, the cutting time for cut piece 2 is doubled to 1.6 seconds.

Finally, a particular arrangement variant for cutting pattern 7 is selected and thus determined based on the previous calculation. This arrangement variant is then used for a large number of cutting patterns 7 to be cut and forms the basis for the cutting process. The cut pieces 1 to 6 are arranged in the rectangular, repeating section 9 of the endless single-layer material web 19, wherein at least one cut piece 1 to 6 or at least one cutting pattern 7 is (only) partially contained in section 9.

Figure 6A:
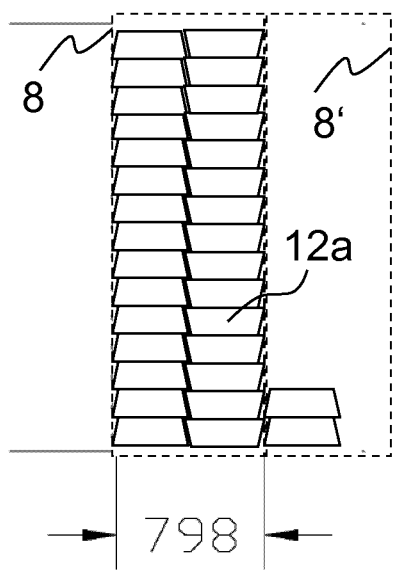
FIGS. 6a-6d show single-type arrangement variants for a group of the same cutting pattern using one of the cut pieces according to the invention.
Figure 6B:
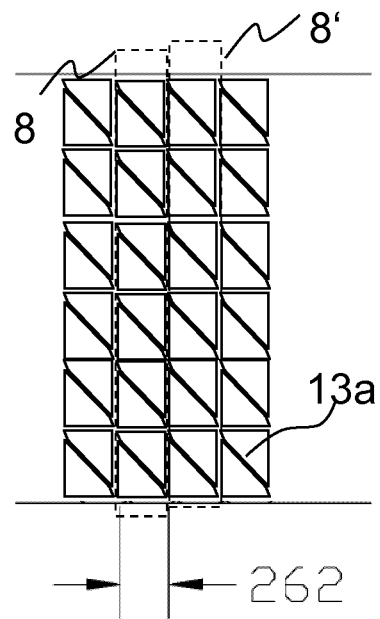
Figure 6C:
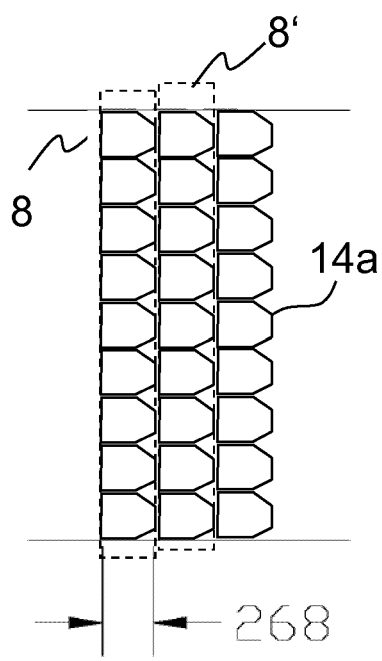
Figure 6D:
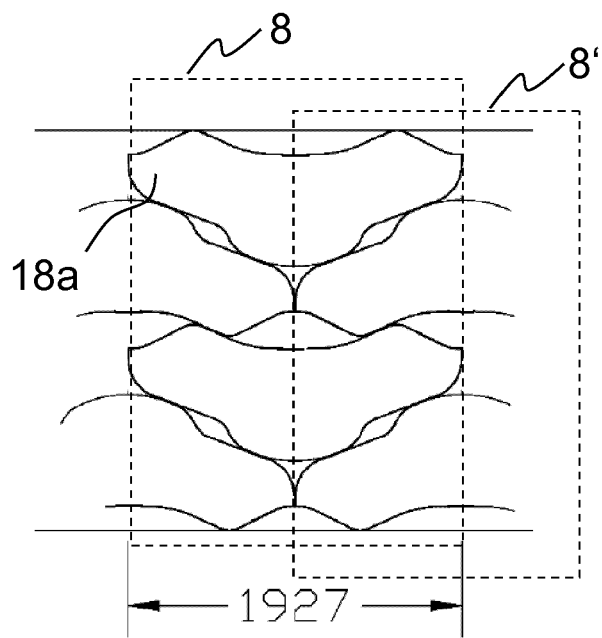
Figure 7:
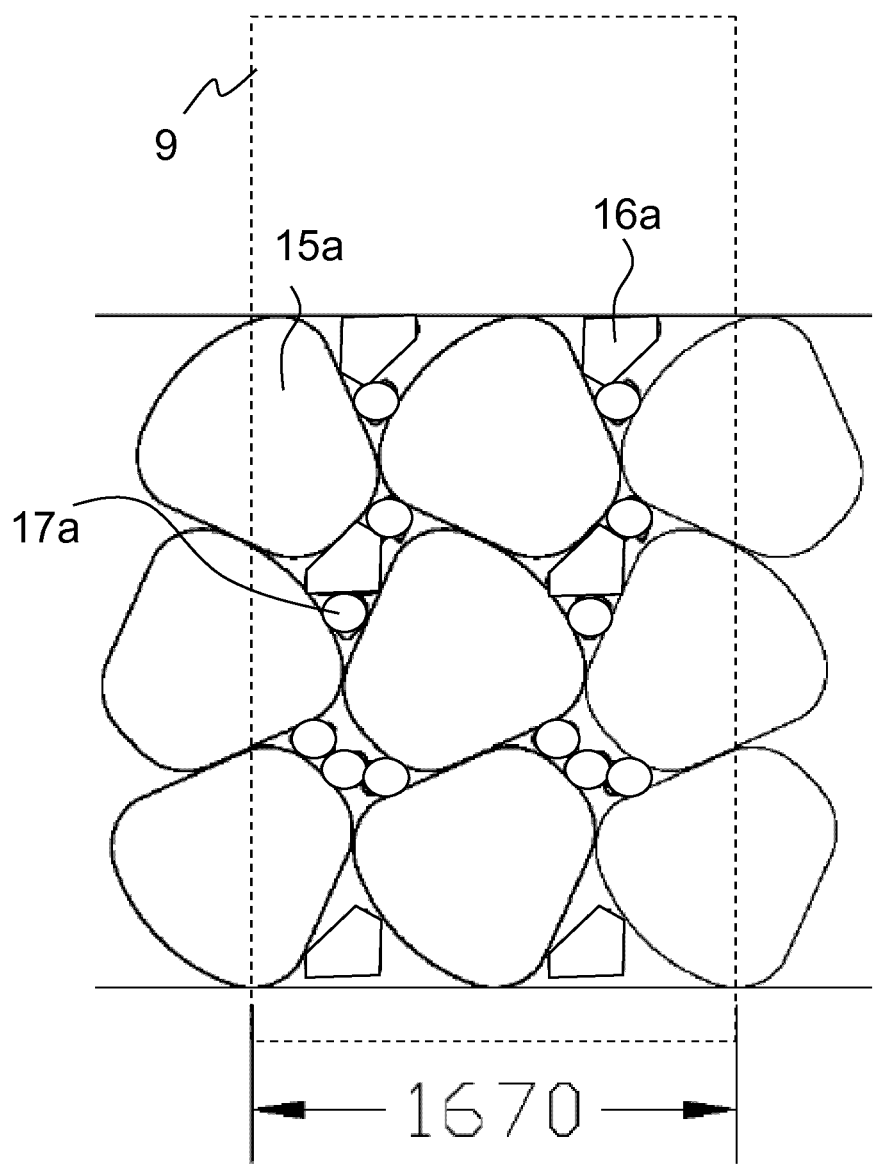
FIG. 7 is an alternative arrangement variant for a group of the same cutting pattern using a subset of the required cut pieces according to the invention.

In FIG. 5 to FIG. 7, arrangement variants for a cutting pattern alternative to FIG. 1 are shown. The cutting pattern shown in FIG. 5 is formed by seven different cut pieces 12 to 18.

In this case, the individual cut pieces 12 to 18 of the cutting pattern in FIG. 5 are for example arranged according to type (as shown in FIGS. 6a to 6d) and the space may be determined individually for the respective cut piece.

In a further arrangement variant, the individual cut pieces 12 to 18 of the cutting pattern are arranged, for example, in subsets (as explained in more detail in FIG. 7) and the space required for the respective subset of cut pieces 12 to 18 is determined. The cut pieces 12 to 18 per subset are selected according to their size or shape. Neither the number of different cut pieces 12 to 18 per subset nor the number of cut pieces 12 to 18 themselves are limited.

Finally, all different cut pieces 12 to 18 of the cutting pattern (as shown in FIG. 5, for example) can be arranged and the space required for the entire cutting pattern with all cut pieces 12 to 18 or a group 8 of the same cutting patterns can be determined.

For each arrangement variant, the space requirement and the material waste are calculated and then the arrangement variant for which the least material waste was calculated is selected. For this purpose, various input parameters can be specified for the process, for example the maximum number of cutting patterns to be cut or a section length or also the minimum material waste to be achieved.

In FIG. 5 a conventional arrangement of the seven different cut pieces 12 to 18 for a group 8 of eight identical cutting patterns is shown as an example. With the arrangement variant from FIG. 5 eight cutting patterns, here eight airbags, can be cut from the material web 19. In FIG. 5 a total of 56 cut pieces 12 to 18 are shown and placed. For illustrative purposes three of the different cut pieces 12 to 18 are indicated with the letters a to c.

All cut pieces 12 to 18 of group 8 of the cutting patterns are placed on a length of 6800 mm, wherein in this exemplary arrangement 30 mm safety distance per transverse side (i.e. side length transverse to the material web 19) has to be taken into account, so that a total safety distance of 60 mm is included. This arrangement variant according to FIG. 5 can also be used for a cutting process with several layers of the material web 19 and the conventional simultaneous cutting by means of a cutting tool. This arrangement variant according to FIG. 5 requires a length of the material web of 6860 millimeters for group 8 of the eight cutting patterns, so that a length of 857.5 millimeters (6860 millimeters divided by number 8) is required for each cutting pattern.

According to the invention, this space requirement per cutting pattern is further reduced in order to minimize material waste. For this purpose, the required space is calculated for various other arrangement variants.

In FIG. 6a to FIG. 6d, the cut pieces 12, 13, 14 and 18 of group 8 of the same cutting patterns are placed according to type.

For example, for cut piece 12 an arrangement variant is chosen where the cut piece 12 is placed according to FIG. 6a. The individual cut pieces 12 are first shifted and/or rotated on the material web in such a way that their space requirement is minimized. According to FIG. 6a, 28 cut pieces 12 of a group of the same cutting patterns are placed on a length of 798 millimeters. In this arrangement variant, the calculation of the space requirement results in that only a length of 29 millimeters (798 millimeters divided by the number 28) is required for each cut piece 12.

Due to the large number of cutting patterns to be cut from the endless material web 19, many more cutting patterns will be placed on the material web 19 as shown in FIG. 6a, so that the 28 cut pieces 12 of group 8 of the cutting pattern are nested directly next to the following group 8' consisting of further cutting patterns or further cut pieces 12. Furthermore, due to the endless material web 19, the safety distance between the individual sections used in FIG. 5 (not explicitly shown here) can be omitted.

A cut piece can be placed in a repeating section 9 of the material web 19 with maximum density at minimum length. The number of cut pieces placed in this section 9 can be less than the maximum number of cut pieces to be placed for a given number of cutting patterns.

In addition, an arrangement variant is also selected for cut piece 13, for example, in which the cut piece 13 is placed according to FIG. 6b. In this case, the individual cut pieces 13 are first shifted and/or rotated on the material web 19 in such a way that their space requirement is minimized. In FIG. 6b a cut piece 13 is rotated by 180° to the adjacent cut piece 13 of this group 8. According to FIG. 6b, 12 cut pieces 13 of group 8 are accommodated over a length of 262 millimeters. In this arrangement variant, the calculation of the space requirement results in that only a length of 22 millimeters (262 millimeters divided by the number 12) is required per cut piece 13.

Due to the large number of cutting patterns to be cut from the endless single layer material web 19, many more cutting patterns will be placed on the material web 19 as shown in FIG. 6b, so that the cut pieces 13 of group 8 of the first 12 cutting patterns are nested directly next to the following group 8' consisting of further cutting patterns or cut pieces 13. In addition, the safety distance between the individual sections used in FIG. 5 (not explicitly shown here) can be omitted on the endless single-layer material web 19.

In addition, for example, an arrangement variant is also selected for cut piece 14, in which the cut piece 14 is placed according to FIG. 6c. The individual cut pieces 14 are first shifted and/or rotated on the material web 19 in such a way that their space requirement is minimized. According to FIG. 6c, 9 cut pieces 14 of a group 8 are placed on a length of 268 millimeters. In this arrangement variant, the calculation of the space requirement results in that only a length of 30 millimeters (268 millimeters divided by the number of 9) is required per cut piece 14.

Due to the large number of cutting patterns to be cut from the endless single layer material web 19, many more cutting patterns can be placed on the material web 19 as shown in FIG. 6c, so that the cut pieces 14 from the group 8 of the first 9 cutting patterns are nested directly next to the following folder 8' consisting of further cutting patterns or cut pieces 13. In addition, the safety distance between the individual sections used in FIG. 5 (not explicitly shown here) can be omitted on the endless single-layer material web 19.

In addition, for example, an arrangement variant is also selected for cut piece 18, in which the cut piece 18 is placed according to FIG. 6d. The individual cut pieces 18 are first shifted and/or rotated on the material web 19 in such a way that their space requirement is minimized. According to FIG. 6d, 4 cut pieces 18 of a group 8 are placed on a length of 1927 millimeters. In this arrangement variant, the calculation of the space requirement results in that only a length of 482 millimeters (1927 millimeters divided by the number 4) is required per cut piece 18.

Due to the large number of cutting patterns to be cut from the endless single layer material web 19, many more cutting patterns can be placed on the material web 19 as shown in FIG. 6d, so that the cut pieces 18 of group 8 of the first 4 cutting patterns are nested in a subsequent group 8' consisting of further cutting patterns or cut pieces 18. Furthermore, due to the endless single-layer material web 19, the safety distance between the individual sections used in FIG. 5 (not explicitly shown here) can be omitted.

FIG. 7 shows a further arrangement variant for the cutting pattern with only a subset of the different cut pieces 12 to 18 of the cutting pattern. In FIG. 7 only a subset consisting of the cut pieces 15, 16 and 17 from all different cut pieces 12 to 18 of the same cutting pattern is placed. For six of this subset consisting of the cut pieces 15, 16 and 17, a material web length of 1670 millimeters is required. Thus, calculating the space requirement results in a material web length of 278 millimeters (1670 millimeters divided by the number 6) for each subset of the cutting pattern.

According to the invention, a large number of cutting patterns are to be cut from the endless single-layer material web 19. Therefore, if more than 5 cutting patterns 7 are to be placed on the material web 19, the large-area cut pieces 1 of group 8 of the first six cutting patterns are nested into the following group 8' consisting of five more cutting patterns 7 to further reduce the space required. In addition, the safety distance between the sections 9 and 9' used in FIG. 5 can be omitted on the endless single-layer material web 19.

In the calculation step a total space requirement per cutting pattern is determined from the arrangement variants according to FIGS. 6a-6d to FIG. 7 in order to reduce the space required for cutting the cutting pattern. A cutting pattern requires a total length of 841 millimeters if its cut pieces 12 to 18 are arranged according to FIG. 6a-6d to FIG. 7. This total length corresponds to the sum of the space requirement of the individual cut pieces, namely 278 millimeters for the subset of cut pieces 15, 16, 17; 29 millimeters for cut piece 12; 22 millimeters for cut piece 13; 30 millimeters for cut piece 14; and 482 millimeters for cut piece 18.

If the cutting pattern is arranged with the arrangement according to FIGS. 6a-6d to FIG. 7 instead of the arrangement according to FIG. 5, a 2% material saving is made possible (857.5 millimeters per cutting pattern according to the arrangement variant of FIG. 5 compared to 841 millimeters per cutting pattern according to the arrangement variant of FIGS. 6a to 6d and FIG. 7).

The cutting time for one of the cutting patterns is 6.6 seconds for two laser cutting scanners or 13 seconds for one laser cutting scanner.

Finally, a particular arrangement variant for the cutting pattern is selected and thus determined based on the previous calculation. This arrangement variant is then used for a large number of cutting patterns to be cut and forms the basis of the cutting process. The cut pieces 12 to 18 are arranged in the rectangular, repeating section 9 of the endless single-layer material web 19, wherein at least one cut piece 12 to 18 or at least one cutting pattern is (only) partially contained in section 9.

In order to achieve a reduction in material, the cutting pattern shown in FIG. 5 is optimized using the method according to the invention in order to determine a material-saving arrangement variant.

Figure 8:
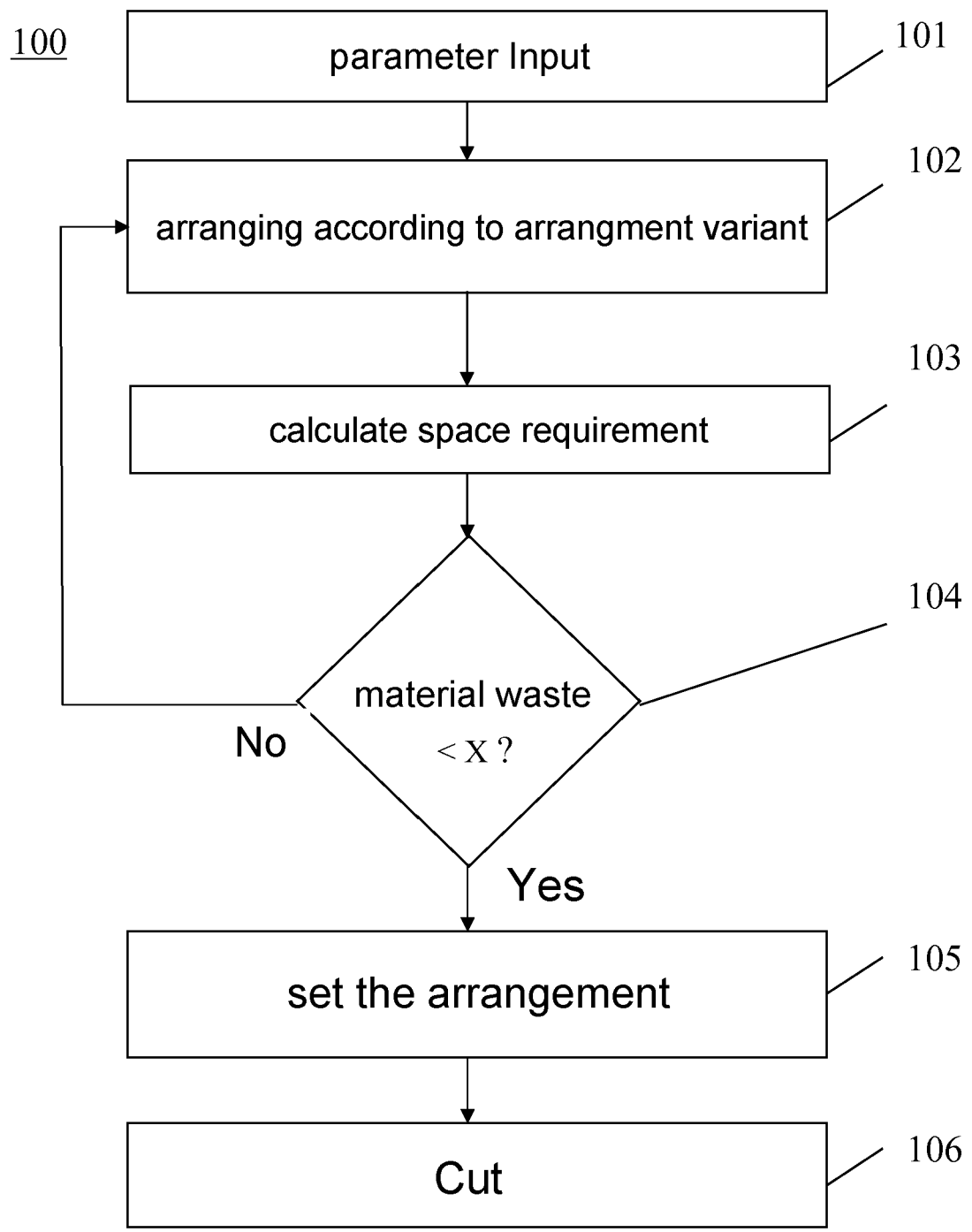
FIG. 8 is an example of a flow chart of a method according to the invention.

FIG. 8 shows an example of a flow chart for a method 100 according to invention. In the optional method step 101, a parameter input is made for the method, for example the length of section 9 or the number of cutting patterns to be cut. In particular, one can specify how many different cutting patterns, cut pieces per cutting pattern etc. are to be placed. In step 102 a placement of cut pieces of at least one cutting pattern on the material web is carried out. In step 103, the system calculates the space required for the arrangement variant placed in step 102. If a space requirement for an arrangement variant has been calculated, the calculated space requirement or a resulting material waste is compared with a threshold value X in the following optional step 104. If the material waste is greater than the specified threshold value X ("no" in the comparison step 104), an alternative arrangement variant is placed in step 102 and the space requirement for this variant is calculated again in step 103 and the comparison step 104 is carried out again. As soon as the material waste is below the threshold value X ("yes" in the comparison step 104), the arrangement is defined in step 105. This defined arrangement can then be stored in a program memory. In step 106 the material web is cut according to the defined arrangement variant.

Within the scope of the invention, all described and/or drawn and/or claimed elements can be combined with each other in any way.

In particular, the minimum space requirement is calculated for several different arrangement variants. For example, a cut piece of a cutting pattern is first placed on the material web. This arrangement is carried out according to the principle of maximum density on minimum length. In this way, it is possible to calculate how much space is required for a single-type arrangement for a cut piece. This arrangement can first be done separately for each cut piece in order to calculate the minimum space requirement with the maximum number of single-type placements.

In a next step of the invention, first cut pieces of the cutting pattern can now be combined with second cut pieces of the cutting pattern. Now the minimum space requirement for this combination—previously referred to as a subset—is calculated for the maximum number of combinations. The number of different cut pieces in a combination can be varied for different calculations, so that the minimum space requirement per length of material web is first calculated for two cut pieces of a cutting pattern and then for three or more cut pieces of a cutting pattern.

In this way, different combinations can be used in conjunction with a single-type placement to create an arrangement variant that has a minimum material waste. The arrangement variant includes at least one rectangular, repeating section, in which a cut piece is only partially included. Not necessarily only a required number of cut pieces is arranged. Rather, the required number of cut pieces is achieved by a multiple repetition of the section. If combinations (subsets) are then calculated, the required number of cut pieces is finally obtained by repeating this combination.

LIST OF REFERENCE NUMERALS

| | |
|---|---|
| 1-6 | cut pieces 1 to 6 |
| 7 | cutting pattern |
| 8, 8' | group of identical cut pieces |
| 9, 9' | repeating section |
| 10 | first portion of the cut piece |
| 11 | second portion of the cut piece |
| 12a-c | cut piece 1 |
| 13a-c | cut piece 2 |
| 14a-c | cut piece 3 |
| 15a-c | cut piece 4 |
| 16a-c | cut piece 5 |
| 17a-c | cut piece 6 |
| 18a-c | cut piece 7 |
| 19 | material web |
| 20 | threshold value for material waste |
| 101-106 | method steps |

The invention claimed is:

1. A method for cutting cut pieces, the cut pieces forming a cutting pattern, including the steps of:
    cutting the cut pieces, wherein the cut pieces are arranged in a rectangular repeating section of a continuous material web, wherein at least one of the cut pieces is only partially included in the repeating section and wherein the arrangement of the cut pieces in the repeating section including the at least one only partially included cut piece is the same for a plurality of consecutive repeating sections; and
    wherein a maximum number of cutting patterns to be cut, a section length or a material waste to be achieved are predetermined input parameters and wherein a predefined length of the material web for a complete arrangement of all cut pieces of a cutting pattern is disregarded.

2. The method according to claim 1, wherein the material web is woven and the cut pieces of the cutting pattern form an airbag or the material web is a woven technical textile.

3. The method according to claim 1, wherein the material web is made of one of the following materials:
    a woven technical textile;
    a metal sheet;
    a foil;
    paper or paperboard; and/or
    a non-woven fabric.

4. The method according to claim 1, wherein the section has a predefined length which can be set as an input parameter for the method.

5. The method according to claim 1, wherein a number of at least one cutting pattern to be cut is predetermined.

6. The method according to claim 1, wherein at least one of the cut pieces is displaced or rotated relative to another cut piece for the arrangement of the cut pieces in a section.

7. The method according to claim 1, wherein, before the cutting step, the cut pieces are arranged in the repeating section of the continuous material web, said arranging comprising the following steps:
    calculating a space requirement of the cut pieces in the section of the material web for at least one arrangement variant of the cut pieces in this section, wherein at least one of the cut pieces is only partially included in the section; and
    selecting the arrangement variant of the cut pieces for this section on the basis of the result of the calculating step.

8. The method according to claim 7, wherein the selected arrangement variant is applied to all of the repeating sections.

9. The method according to claim 7, wherein the calculation of the space requirement of the cut pieces in the section of the material web is carried out on the basis of a single-type arrangement of the cut pieces in the section as an arrangement variant.

10. The method according to claim 7, wherein the calculation of the space requirement of the cut pieces in the section of the material web is carried out on the basis of all cut pieces of at least one cutting pattern in the section as an arrangement variant.

11. The method according to claim 7, wherein the selection of the arrangement variant is carried out as soon as a predefined threshold value for a material waste is reached or as soon as a calculation time has exceeded a predefined threshold value.

12. The method according to claim 7, wherein the calculation of the space requirement of the cut pieces in the section of the material web is carried out on the basis of a subset of different cut pieces in the section as an arrangement variant.

13. The method according to claim 12, wherein the selection of the different cut pieces is based on a subset according to an area of the cut piece and/or a shape of the cut piece.

* * * * *